No. 770,303. PATENTED SEPT. 20, 1904.
J. B. McGINLEY.
ELECTRICAL CONDUIT.
APPLICATION FILED MAR. 19, 1903.
NO MODEL.
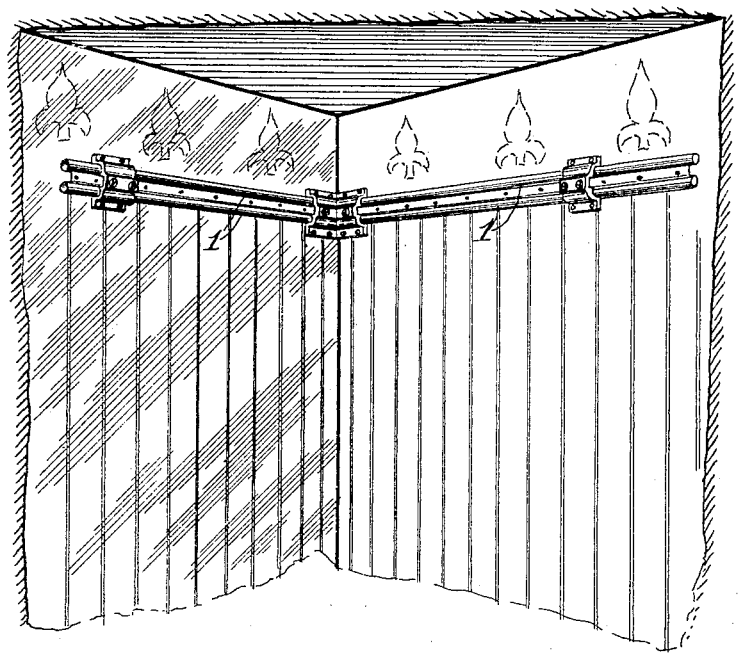
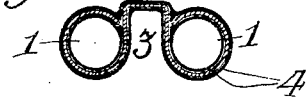
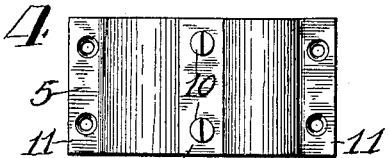
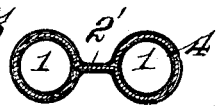
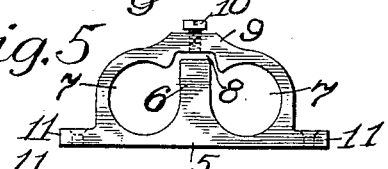
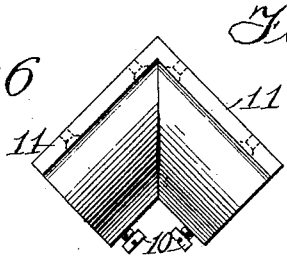
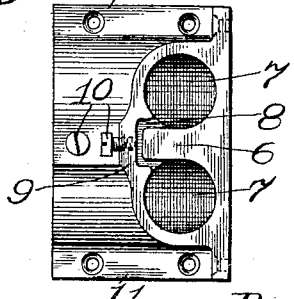
Witnesses:
Geo. B. Rowley.
E. E. Potter.
Inventor;
J. B. McGinley.
By H. P. Ewert & Co.
Attorneys.

No. 770,303. Patented September 20, 1904.

UNITED STATES PATENT OFFICE.

JAMES B. McGINLEY, OF ALLEGHENY, PENNSYLVANIA.

ELECTRICAL CONDUIT.

SPECIFICATION forming part of Letters Patent No. 770,303, dated September 20, 1904.

Application filed March 19, 1903. Serial No. 148,486. (No model.)

*To all whom it may concern:*

Be it known that I, JAMES B. MCGINLEY, a citizen of the United States of America, residing at Allegheny, in the county of Allegheny and State of Pennsylvania, have invented certain new and useful Improvements in Electrical Conduits, of which the following is a specification, reference being had therein to the accompanying drawings.

My invention relates to electrical conduits or tubing for the laying of electrical conductors; and the primary object of my invention is to provide a practically insulated conduit for the reception of the wires, this conduit or tubing being adapted to take the place of and be employed particularly for places where a molding is now generally employed for the covering of the conductors.

In the wiring of a building, where the wires are stretched along the walls, on the ceiling, or the like, it is the common practice to cover the wires or conductors with a wooden molding constructed for this purpose. It is my object to dispense entirely with this molding and provide a conduit or tubing which receives the wires or conductors and in itself acts as the molding in appearance. The employment of wooden molding is fraught with danger, as the wire often becomes unwrapped, thus bringing the "bared" portion of the wire or conductor in contact with the wood and setting fire to the same. This danger I entirely obviate with my invention, as the tubing or conduit is so constructed as to be practically insulated, so that in event of the wire being bared at any point and engaging with the tubing or conduit no danger accompanies the same.

In describing the invention in detail reference will be had to the accompanying drawings, forming a part of this application, and wherein like numerals of reference will be employed for designating like parts throughout the different views of the drawings, in which—

Figure 1 is a detail perspective view of a portion of a room, showing my improved conduit or tubing applied to the walls thereof. Fig. 2 is a cross-sectional view of the preferred form of my improved conduit or tubing. Fig. 3 is a like view of a modified form of construction. Fig. 4 is a top plan view of a form of a connector employed for securing the form of conduit or tubing shown in Fig. 2 in position on the wall or ceiling. Fig. 5 is an end view of the same. Fig. 6 is a top plan view of a form of connector which may be employed for connecting the angles of the conduit or tubing, and Fig. 7 is an end view of the same.

My improved conduit or tubing is made from a single sheet or piece of metal so bent or shaped as to form a separate tube or conduit for each of the wires or conductors, the double conduit or tube after being formed being subject to baths of japan and baked in order to render the same insulated. To this end I take a piece or sheet of metal and coil up the two edges thereof to form the two tubes 1, the intermediate portion of the metal being struck up to approximately U shape, the closed end thereof forming the connecting-bar between the two tubes or conduits, this bar 2 being adapted to receive the nails, screws, or other fastening means, which will enter the space 3 between the two tubes or conduits 1 without danger of engaging with the tubes or conduits. After I have shaped the piece or sheet of metal in this manner I subject the same to three baths of japan, baking the same after each bath in order to thoroughly cover the same both inside and outside with insulation 4. It will of course be evident that after the conduit or tubing is in place the same has a smooth interior and exterior surface or coat, and the exterior surface may be varnished or painted, if desired. In Fig. 3 the same method is employed, the connecting-bar 2', however, being intermediate the diameter of the two tubes or conduits, the metal being bent substantially in the forms of the figure 8 or letter S.

In connection with the form of conduit or tubing illustrated in Fig. 2 I have shown a form of connector employed for connecting the strips of the conduit or tubing together and hiding the joints between the same, as well as assisting in securing the same, to the wall or ceiling. This connector may be cast and embodies a base 5, with a central post 6, two openings 7 to receive the two tubes of the conduit, and a space 8 between the top of the post and the connecting cross-bar 9 to permit the entrance of the cross-bar 2 of the conduit. The top bar 9 may be fastened to the cross-bar 2 by means of a screw 10, and the extending lugs 11 of the base are apertured to receive screws or nails, by means of which the connector is fastened to the ceiling or wall. In Figs. 6 and 7 is shown an angle junction-box of the same form of construction adapted to join two strips of the conduit at an angle, and as the construction is the same, except that two members are employed placed at right angles to each other, the same reference-numerals have been applied thereto. It will of course be evident that for the form of conduit shown in Fig. 3 a connector conforming thereto would be employed and that for any variation in the construction of the conduit from the two forms shown the connector and junction-box would be varied to conform thereto.

In the requirements for electrical wiring it is oftentimes demanded that all interior wiring be insulated from all woodwork, and yet on the ceilings and walls the wires or conductors are laid in direct contact with the wooden molding which covers them. Thus the precaution of insulating the interior work is lost by reason of the wiring employed for the ceilings and walls. Where my improved conduit is employed, the wiring on the ceilings and walls is as effectually insulated as the interior work and the conduit having the appearance of molding the same effect is retained.

While particularly adapted for the purpose specified, it will of course be evident that the conduit may be employed in any connection where it may be applicable, and it will be noted that various changes may be made without departing from the spirit of the invention.

Having fully described my invention, what I claim as new, and desire to secure by Letters Patent, is—

1. A conduit for electrical conductors composed of sections of sheet metal, each section consisting of a single sheet and comprising a central web and integral circular side portions, the central web being formed with inwardly-bent edges and the edges of the circular side portions meeting the said edges of the web upon the outer side of the same and the central web being disposed tangentially to said circular side portions substantially as shown and described.

2. In a conduit for electrical conductors, the combination with a double tube composed of cylindrical shells united by a web, of a conductor having a base, a central post, two openings to receive the cylindrical shells of the conduit, a slot extending between said openings to accommodate the said web and a screw projecting into said slot, substantially as described.

In testimony whereof I affix my signature in the presence of two witnesses.

JAMES B. McGINLEY.

Witnesses:
A. M. WILSON,
EDW. J. AUDLER.